(12) United States Patent
Venugopal et al.

(10) Patent No.: US 12,050,566 B2
(45) Date of Patent: Jul. 30, 2024

(54) MIGRATION TOOL

(71) Applicant: SAP SE, Walldorf (DE)

(72) Inventors: Indu Venugopal, Bangalore (IN); Reena Sethy, Bangalore (IN)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 17/735,589

(22) Filed: May 3, 2022

(65) Prior Publication Data

US 2023/0359596 A1 Nov. 9, 2023

(51) Int. Cl.
*G06F 16/21* (2019.01)
*G06F 16/28* (2019.01)

(52) U.S. Cl.
CPC .......... *G06F 16/214* (2019.01); *G06F 16/288* (2019.01)

(58) Field of Classification Search
CPC ............................ G06F 16/214; G06F 16/288
See application file for complete search history.

(56) References Cited

U.S. PATENT DOCUMENTS

| | | | | |
|---|---|---|---|---|
| 10,108,645 | B1 * | 10/2018 | Bigman | G06F 16/2219 |
| 11,372,828 | B1 * | 6/2022 | Bendapudi | G06F 16/258 |
| 11,836,125 | B1 * | 12/2023 | Skinner | G06F 16/214 |
| 2016/0078079 | A1 * | 3/2016 | Hu | G06F 16/20 |
| | | | | 707/803 |
| 2020/0167323 | A1 * | 5/2020 | Swamy | G06F 16/256 |
| 2022/0188279 | A1 * | 6/2022 | Krishnaraju | G06F 16/258 |

OTHER PUBLICATIONS

Ellison, Martyn, Radu Calinescu, and Richard F. Paige. "Evaluating cloud database migration options using workload models." Journal of Cloud Computing. 2018 (Year: 2018).*
Pérez-Castillo, Ricardo, Ignacio Garcia-Rodriguez De Guzman, and Mario Piattini. "Knowledge Discovery Metamodel—ISO/IEC 19506: A standard to modernize legacy systems." Computer Standards & Interfaces 33.6 (2011) (Year: 2011).*
Roth, Mary, et al. "XML mapping technology: Making connections in an XML-centric world." IBM Systems Journal 45.2 (2006) (Year : 2006).*

(Continued)

*Primary Examiner* — Mohsen Almani
(74) *Attorney, Agent, or Firm* — SCHWEGMAN LUNDBERG & WOESSNER, P.A.

(57) ABSTRACT

Various examples are directed to systems and methods for migrating an analytics tool from a source deployment to a target deployment. A migration tool may access source metadata describing a plurality of source deployment queries to the at least one source deployment database. The migration tool may identify a plurality of source deployment database artifacts using the source metadata and migrate the plurality of source deployment database artifacts to a target database. The migration tool may apply a trained model to the plurality of source deployment database artifacts to generate a set of data relationships and generate a first analytics report from the migrated plurality of source deployment database artifacts at the target database, the first analytics report corresponding to at least one of the set of data arrangements.

20 Claims, 7 Drawing Sheets

(56) References Cited

OTHER PUBLICATIONS

Jia, Tianyu, et al. "Model transformation and data migration from relational database to MongoDB." 2016 IEEE international congress on big data (BigData Congress). IEEE, 2016 (Year: 2016).*

Li, Shunyang, et al. "SQL2Cypher: automated data and query migration from RDBMS to GDBMS." Web Information Systems Engineering—WISE 2021: 22nd International Conference on Web Information Systems Engineering, WISE 2021, Melbourne, VIC, Australia, Oct. 26-29, 2021 (Year: 2021).*

Wikramanayake, G. N. "Re-engineering Databases using Meta-Programming Technology." Proceedings of 16th National Information Technology Conference, Computer Society of Sri Lanka (CSSL), Colombo, 11th. 1997 (Year: 1997).*

* cited by examiner

MIGRATION TOOL

BACKGROUND

Traditionally, software has been self-contained and executed at one or more local machines comprising an on-premise computing system. An enterprise desiring to use a software tool builds an on-premise computing system and executes a software application to provide the tool on that computing system. Cloud computing has disrupted this paradigm. Cloud computing allows enterprises to supplement or replace on-premise computing systems with cloud software, platforms, and even computing infrastructure provided as a service.

BRIEF DESCRIPTION OF DRAWINGS

The present disclosure is illustrated by way of example and not limitation in the following figures.

DETAILED DESCRIPTION

Figure 1:
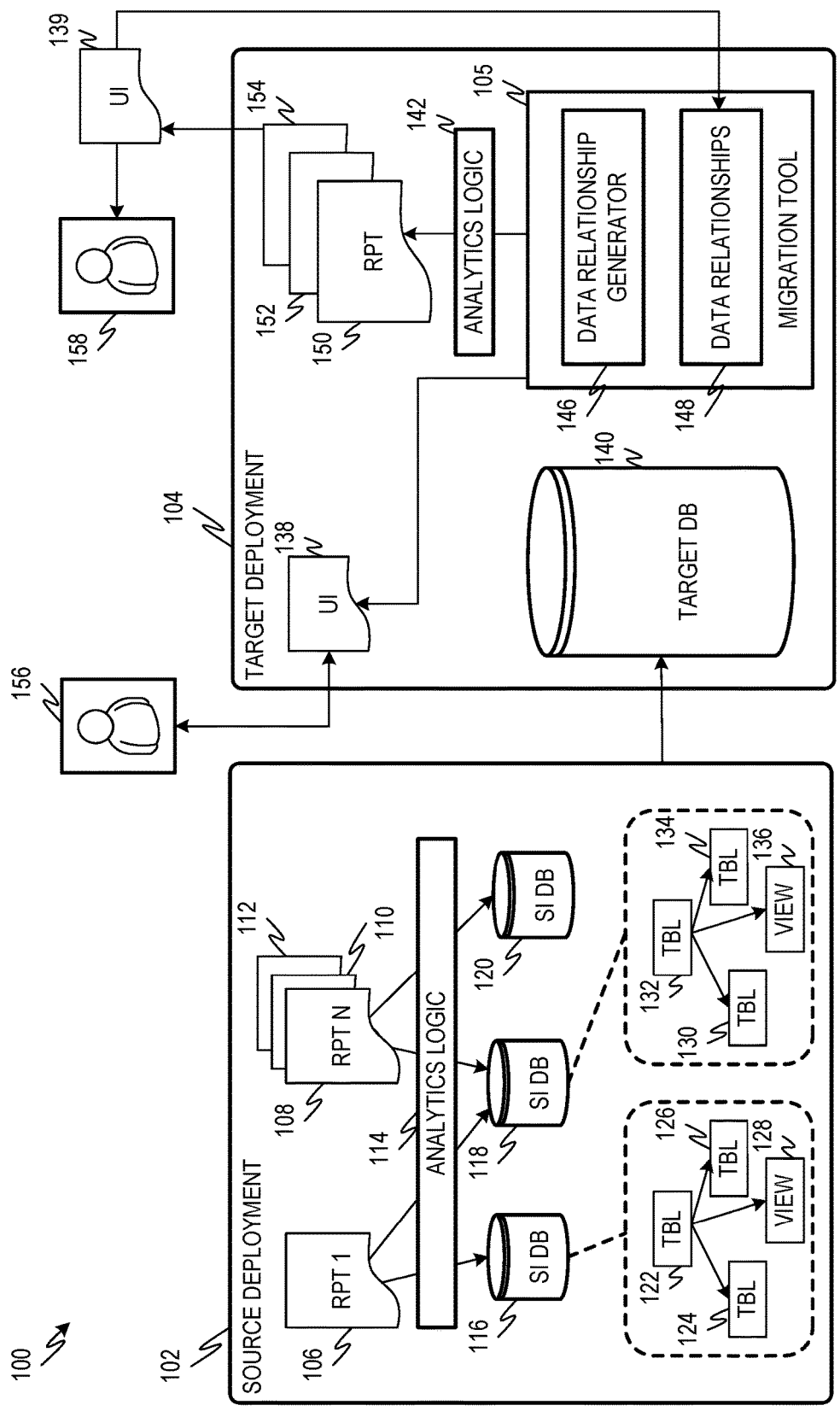
FIG. 1 is a diagram showing one example of an environment for migrating an analytics tool.

One challenge associated with cloud computing is related to migrating or moving a previously implemented tool from a source deployment to a cloud deployment at a cloud environment. Consider an example legacy business intelligence (BI) tool. A BI tool utilizes data stored at one or more underlying databases to generate analytics reports for business users. The analytics reports generated by a BI tool may include combinations and/or visualizations of business-related data drawn from the underlying database or databases. The BI tool executes analytics logic to access, process and/or combine data from the one or more underlying databases to generate the analytics reports.

Migrating a BI tool to a cloud environment involves migrating the data at the one or more databases and also migrating and/or recreating the analytics logic. It will be appreciated that the analytics logic may be related to way that the data is stored at the source deployment. For example, at the source deployment, data may be stored at multiple databases and/or different schemas having different tables, views, and/or other database artifacts. Further, analytics logic for generating analytics reports is often created over time through an extended trial-and-error process as business users work with information technology (IT) users to hone and refine BI analytics reports.

In some examples, a BI tool migration may involve first recreating the one or more source deployment databases to a target database at the target deployment. Then business users, sometimes in conjunction with IT users, then rebuild the analytics logic at the target deployment to generate the same analytics reports that were generated at the source deployment. Because the users who build the analytics reports (IT users) may not be the same users who consume the analytics reports (business users), the migration process can be arduous, time-consuming, and labor intensive.

Various examples address these and other concerns utilizing a migration tool for migrating a BI tool from a source deployment to a target deployment. The migration tool may access source metadata from the source deployment. The source metadata indicates one or more queries made to the source deployment database or databases to generate various source deployment analytics reports. From the queries, the migration tool may identify a plurality of source deployment database artifacts, such as tables and/or views. The identified source deployment database artifacts may be migrated to a target database at the target deployment.

The migration tool may use the identified source deployment database artifacts to generate reports in a more streamlined manner. For example, the migration tool may utilize a trained machine learning model to derive a set of data relationships from the migrated database artifacts. The set of data relationships may indicate, for example, may indicate potential insights about the migrated data. Some of the example data relationships may relate metric parameters to other parameters, such as geographic location parameters, time parameters, and/or the like. The set of data relationships may describe potential analytics reports and/or items that may be desirable to include in analytics reports. Using the machine learning model to extract the data relationships may yield relationships that were reflected in source deployment analytics reports and, in some examples, new relationships that were reflected in the source deployment data but not incorporated into source deployment analytics reports.

From the data relationships, the migration tool may generate a questionnaire including a set of questions for a user, such as a business user. In some examples, each question corresponds to at least one of the set of data relationships. The user may indicate whether a question and its corresponding data relationship or relationships is a suitable and/or desirable subject for an analytics report. Analytics logic at the target deployment may generate at least one analytics report utilizing data relationships indicted by the user.

The migration tool described herein may provide various advantages. For example, migrating data that is actually used to generate analytics reports instead of blindly migrating all data from the source deployment may save resources by eliminating unnecessary replication. Also, extracting data relationships and building analytics reports from the extracted data relationships may streamline the migration by reducing back-and-forth between IT users and business users. Further, in some examples, data relationships extracted from migrated database artifacts that were already prescreened for relevance may tend to be more meaningful and potentially significant that relationships derived from bulk analytics of the data at the source deployment databases. In some examples, the disclosed arrangement using data relationships may improve the quality of analytics reports generated at the target deployment, by recognizing relationships that may not have been previously recognized and/or providing business users with functionality to create analytics reports based on relationships that may not have been fully appreciated previously.

FIG. 1 is a diagram showing one example of an environment 100 for migrating an analytics tool, such as a BI tool. The environment 100 includes a source deployment 102 and a target deployment 104. A migration tool 105 executes at the target deployment to migrate various data from source deployment databases 116, 118, 120 and corresponding analytics reports 106, 108, 110, 112 to the target deployment 104, as described herein.

In some examples, the source deployment 102 is an on-premise deployment. In an on-premise deployment, the various components of the source deployment 102 may be executed at one or more computing devices located at a premises of the consuming entity that consumes the analytics reports 106, 108, 110, 112 generated at the source deployment. The consuming entity may be, for example, a business enterprise or other entity associated with users who consume the analytics reports 106, 108, 110, 112. In an on-premise deployment, the consuming entity may maintain one or more servers, data centers, network appliances, and/or other computing hardware that execute or otherwise implement the various components of the source deployment 102.

In some examples, all or part of the source deployment 102 is implemented using a cloud platform deployment. According to a cloud platform deployment, a client enterprise uses a cloud hyperscaler to implement computing infrastructure. A cloud hyperscaler is a service that maintains one or more data centers comprising various computing hardware. Examples of cloud hyperscaler services include AWS™ from Amazon.com, Inc., Google Cloud™ from Google LLC., Azure™ from Microsoft, Inc., and Alibaba Cloud™ from Alibaba Group Holding Limited, among others.

The source deployment 102 may be implemented in a public cloud environment and/or at a private cloud environment. In a private cloud environment, the consuming entity may execute applications, implement storage, and the like, to implement the source deployment at the cloud environment. Users of the consuming entity may access the applications, storage, etc., at the private cloud deployment, for example, to consume the analytics reports 106, 108, 110, 112.

In a private cloud environment, the consuming entity executes applications, implements storage, and the like, at a cloud deployment. In a public cloud environment, a cloud deployment is arranged into a number of tenancies implemented by a client entity. The client entity may provide one or more components of the source deployment at a public cloud environment. The consuming entity may hold one or more tenancies, allowing users of the consuming entity to access the public cloud environment to consumer the analytics reports 106, 108, 110, 112.

The source deployment 102 comprises analytics logic 114 that generates one or more analytics reports 106, 108, 110, 112 based on data stored at source deployment databases 116, 118, 120. The analytics logic 114, source deployment databases 116, 118, 120 and/or various analytics reports 106, 108, 110, 112, in some examples, implement all or part of a BI tool such as, for example, Power BI® available from Microsoft Corporation of Redmond, Washington, Business Intelligence Design Studio, also available from Microsoft Corporation, Tableau available from salesforce.com, inc., of San Francisco, California, SAP® Analytics Cloud application available from SAP SE of Waldorf, Germany, or any other suitable BI tool product.

Analytics reports 106, 108, 110, 112 may be documents that are derived from data at the one or more source deployment databases 116, 118, 120. For example, when the analytics logic 114 implements a BI tool, the analytics reports 106, 108, 110, 112 may include data describing business parameters. Analytics reports may be formatted in various different ways. In some examples, one or more of the analytics reports, 106, 108, 110, 112 are formatted as a document, such as a web document or other document suitable for presentation to a user at a user interface dashboard or other user interface screen. In some examples, one or more of the analytics reports, 106, 108, 110, 112 are formatted as documents, such as Portable Document Format (PDF) or another format that is suitable for display and distribution, for example, to multiple users.

Analytics logic 114 builds the various analytics reports 106, 108, 110, 112 from data stored at the source deployment databases 116, 118, 120. Although three source deployment databases 116, 118, 120 are shown in FIG. 1, it will be appreciated that some examples may include more or fewer source deployment databases 116, 118, 120. The source deployment databases 116, 118, 120 may be or include any suitable type of database such as, for example, an SAP HANA database available from SAP SE of Waldorf, Germany, a SQL Server database available from Microsoft Corporation of Redmond, Washington, an Oracle Database available from the Oracle Corporation of Austin, Texas, or any other suitable database.

Data stored at the source deployment databases 116, 118, 120 may include metric parameters and dimension parameters. Metric parameters may include quantitative measurements and dimension parameters are attributes of the data. Consider an example record that describes sales for a first business unit in a first geographic area over a first period of time. The sales figure (e.g., in dollars or another suitable currency) may be a metric parameter. The first business unit, first geographic area, and first period of time may be dimension parameters describing the sales metric parameter.

Data at the source deployment databases 116, 118, 120 may be arranged into various schema including different source deployment database artifacts 122, 124, 126, 128, 130, 132, 134, 136. Source database artifacts 122, 124, 126, 128, 130, 132, 134, 136 may include arrangements of data at the source deployment databases 116, 118, 120 such as tables and views. A table may be a collection of data records at a database. A view may be a result of a stored query at a database. For example, a view may draw data from one table or from multiple tables. In this example, the source deployment database 116 includes source deployment database artifacts 122, 124, 126 that are tables and a source deployment database artifact 128 that is a view. Also in this example, the source deployment database 118 includes source deployment database artifacts 130, 132, 134 that are tables and a source deployment database artifact 136 that is a view. It will be appreciated that the source deployment database artifacts 122, 124, 126, 128, 130, 132, 134, 136 shown in FIG. 1 are examples and that the source deployment databases 116, 118, 120 may have more or fewer artifacts that what is shown in FIG. 1 in the same or in different arrangements or schemas.

The target deployment 104, in some examples, is a cloud deployment, such as a public or private cloud deployment. In some examples, the target deployment 104 implements a BI tool, such as the SAP® Analytics Cloud application available from SAP SE of Waldorf, Germany. In the example of FIG. 1, the target deployment 104 comprises analytics logic 142, a migration tool 105, and a target database 140. The analytics logic 142 may comprise one or more executables or other software components that execute at the target deployment 104 to generate one or more analytics reports 150, 152, 154, as described herein.

The migration tool 105 may comprise one or more executables or other software components executing at the target deployment 104 to migrate one or more BI tools from the source deployment 102 to the target deployment 104. Although the migration tool 105 executes at the target deployment 104 in the example of FIG. 1, it will be appreciated that the migration tool 105 may execute at various other systems or deployments such as, for example, at the source deployment 102 and/or at another deployment or system not shown in FIG. 1.

In some examples, the migration tool 105 is in communication with one or more user groups 156, 158. The user groups 156, 158 include one or more users who may be in communication with the migration tool 105 via one or more user computing devices. User computing devices may include, for example, laptop computers, desktop computers, mobile computing devices, and/or the like. In some examples, the user group 156 comprises one or more administrative users who are IT or other professionals having administrative responsibility for the source deployment 102 and/or the target deployment 104. In some examples, the user group 158 includes business users, who may not have IT expertise but may, in some examples, be consumers of the analytics reports 150, 152, 154. One or more users from the user group 158 may select data relationships 148 to be the basis of the one or more analytics reports 150, 152, 154, as described herein.

Figure 2:
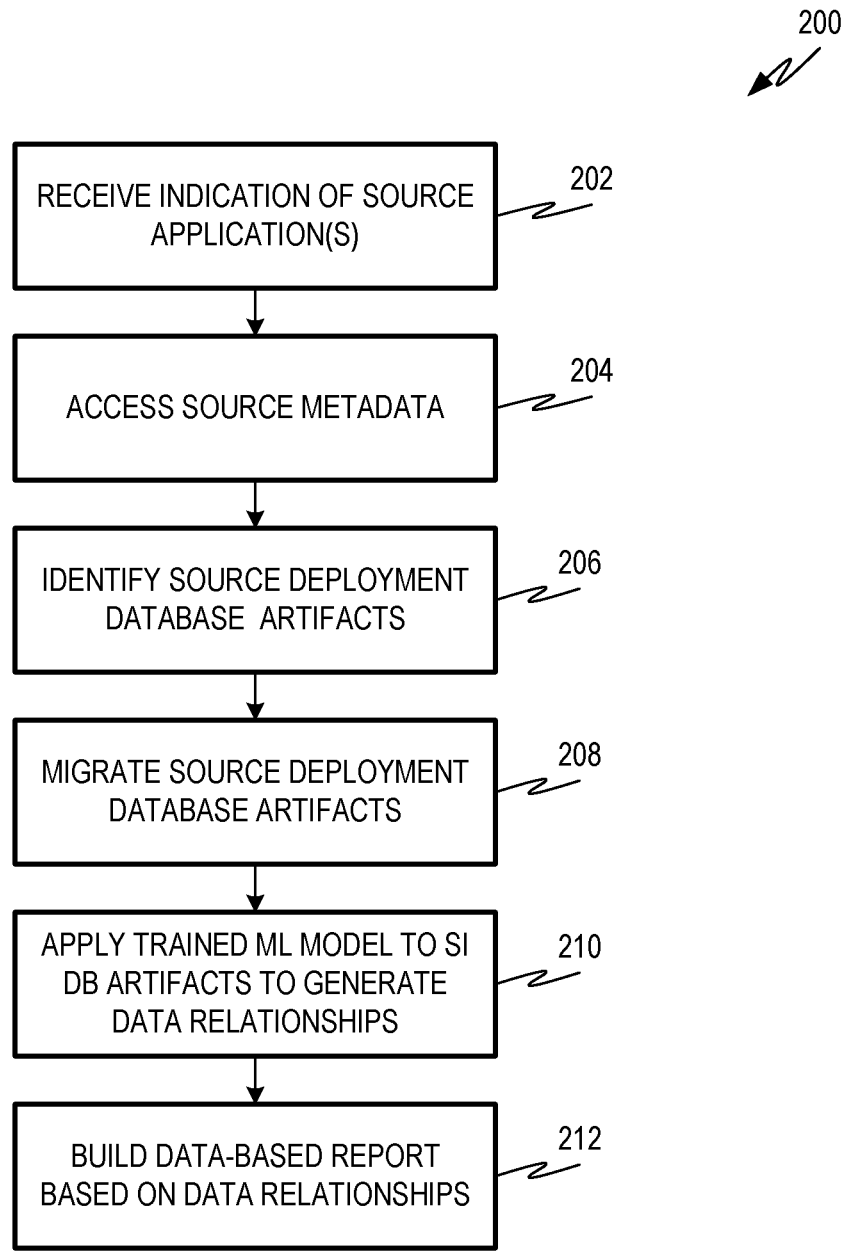
FIG. 2 is a flowchart showing one example of a process flow that may be executed in the environment of FIG. 1 to migrate an analytics tool from the source deployment to the target deployment.

FIG. 2 is a flowchart showing one example of a process flow 200 that may be executed in the environment 100 of FIG. 1 to migrate an analytics tool from the source deployment 102 to the target deployment 104. At operation 202, the migration tool 105 receives an indication of the analytics tool to be migrated. In some examples, the migration tool 105 provides the user group 156 with a user interface (UI) 138. The UI 138 may prompt one or more users of the user group 156 to select a source analytics tool to be migrated to the target deployment 104. For example, the source application may be a BI tool or other analytics tool implemented by the source analytics logic 114 and/or other components of the source deployment 102. The user may indicate the source application, for example, by providing a name of the source application, a Universal Resource Locator (URL) or other address indicating the source application and/or the source deployment 102, and/or the like. Also, in some examples, the user may indicate the source application by indicating the one or more of the analytics reports 106, 108, 110, 112 to be migrated.

At operation 204, the migration tool 105 accesses source metadata at the source deployment 102. Source metadata may describe one or more queries made to the source deployment databases 116, 118, 120. For example, the source metadata may describe queries made by the analytics logic 114 to the source deployment databases 116, 118, 120 in the course of generating the analytics reports 106, 108, 110, 112. The migration tool 105 may use the source metadata to identify a plurality of source deployment database artifacts that are relevant to the analytics reports 106, 108, 110, 112. For example, the source metadata may indicate queries executed to generate the respective analytics reports 106, 108, 110, 112. Additional examples demonstrating how the migration tool 105 may access source metadata are described herein, for example, with respect to the process flow 300 of FIG. 3.

At operation 206, the migration tool 105 utilizes the source metadata to identify a set of the source deployment database artifacts 122, 124, 126, 128, 130, 132, 134, 136 for migrating to the target deployment 104. For example, the migration tool 105 may crawl the source deployment databases 116, 118, 120 to identify source deployment database artifacts that are directly accessed via the queries indicated by the source metadata as well as other source deployment database artifacts on which the directly accessed artifacts depend. In some examples, a graphing algorithm may be used to identify source deployment database artifacts, such as Dijkstra's algorithm or another suitable algorithm. The identified source deployment database artifacts may be migrated to the target database 140. Additional examples demonstrating how the migration tool 105 identifies source deployment database artifacts for migrating are described herein, for example, with respect to the process flow 400 of FIG. 4. At operation 208, the migration tool 105 migrates data from the identified source deployment database artifacts to the target database 140. In some examples, the target database 140, or other suitable component of the target deployment 104, may maintain a live connection maintained with the original sources of data (e.g., source deployment databases 116, 118, 120) for data integrity.

At operation 210, the migration tool 105 may utilize a data relationship generator 146 to identify data relationships in the data migrated to the target database 140. In some examples, the data relationship generator 146 is or utilizes a trained machine learning model, such as a neural network model, to identify data relationships 148. In some examples, the identified data relationships include relationships between metric parameters and various dimension parameters such as, for example, time and geographic location parameters, as described herein. Additional examples demonstrating the generating of data relationships are provided herein, for example, with respect to the process flow 500 of FIG. 5.

The data relationships 148 may be provided to one or more users of a user group 158, for example, as a questionnaire. In some examples, the questionnaire is provided to one or more users of the user group 158 via a UI 139. The user group 158 may include users associated with business operations of the consuming entity. For example, users from the user group 158 may be actual and/or potential consumers of the analytics reports 150, 152, 154 generated at the target deployment 104. The user or users of the user group 158 may indicate a subset of the data relationships 148 that are suitable to be the basis of some or all of an analytics report 150, 152, 154. At operation 212, the analytics logic 142 may build at least one analytics report 150, 152, 154 based on the set of the data relationships 148 indicated by the user group 158. The at least one analytics report 150, 152, 154 may be provided to the user group 158 (e.g., one or more users thereof) via the UI 139, which may the same UI 139 used to provide the data relationships 148 and/or a different UI. Also, the users consuming the analytics reports 150, 152, 154 may be the same users or users who evaluated the data relationships 148 and/or different users.

Figure 3:
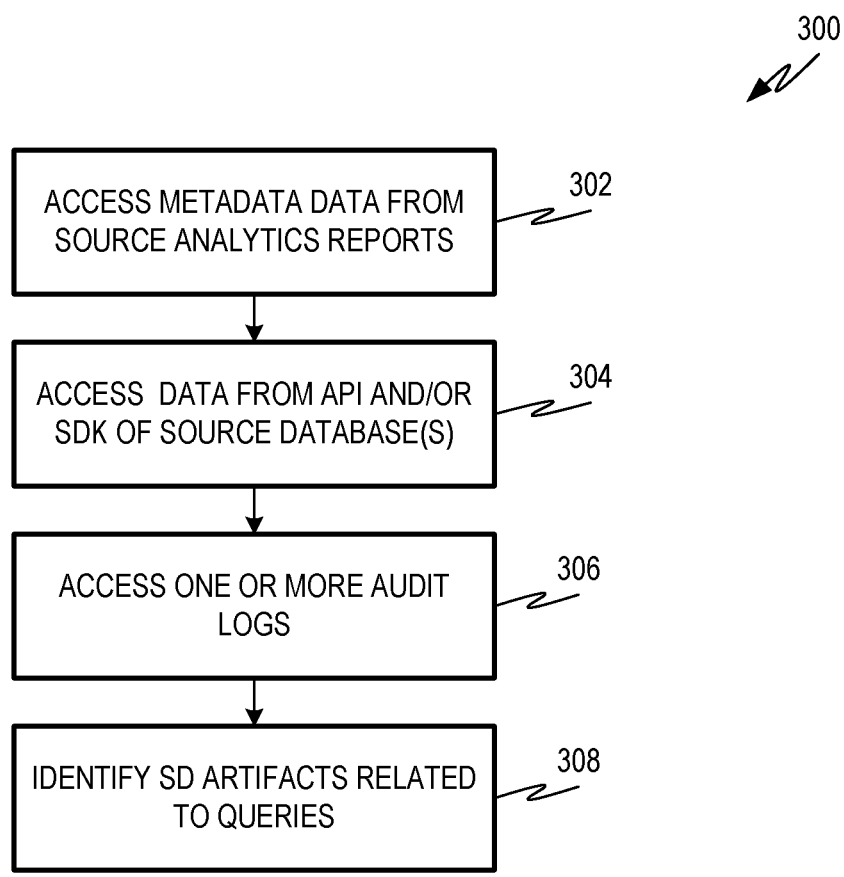
FIG. 3 is a flowchart showing one example of a process flow that may be executed by the migration tool to access source metadata at the source deployment.

FIG. 3 is a flowchart showing one example of a process flow 300 that may be executed by the migration tool 105 to access source metadata at the source deployment 102. At operation 302, the migration tool 105 may access metadata from one or more source analytics reports 106, 108, 110, 112 at the source deployment 102. Metadata from the analytics reports 106, 108, 110, 112 may indicate queries that were made to the source deployment databases 116, 118, 120 in generating the analytics reports 106, 108, 110, 112.

At operation 304, the migration tool 105 may access source metadata from one or more of an application program interface (API) and/or software development kit (SDK) for the analytics logic and/or the database management systems of one or more of the source deployment databases 116, 118, 120. An API may manage communications between different components of the source deployment. An API may manage communications between the analytics logic 114 and/or the source deployment databases 116, 118, 120. For example, the analytics logic 114 may direct a query to one of the source deployment databases 116, 118, 120 by providing a request to the API (not shown). The API may, in turn, send the request to the appropriate source deployment database 116, 118, 120. The source deployment database 116, 118, 120 may execute the query and provide results to the API, which may forward the results to the analytics logic. In some examples, the structure of the API may indicate the queries that can be requested by the analytics logic. Also, in some examples, the API may maintain a record of queries actually requested by the analytics logic 114. The migration tool 105 may gather the descriptions of queries that can be requested and/or records of queries that were requested as source metadata.

An SDK may be provided, for example, by one or more of the source deployment databases 116, 118, 120 to describe interactions with the source deployment database 116, 118, 120. For example, the analytics logic 114 may utilize the SDK to formulate and provide queries to one or more of the source deployment databases 116, 118, 120. The migration tool 105 may access the SDK to determine the queries that may be made to the source deployment databases 116, 118, 120, which may be source metadata.

At operation 306, the migration tool 105 may access one or more audit logs or reports at the source deployment. For example, the analytics logic 114 and/or source deployment databases 116, 118, 120 may maintain records of queries requested by the analytics logic 114 and/or queries received and/or executed by the source deployment databases 116, 118, 120. The migration tool may access the audit logs or reports to obtain source metadata describing the queries made.

At operation 308, the migration tool 105 uses the source metadata to identify a plurality of source deployment database artifacts 122, 124, 126, 128, 130, 132, 134, 136. The identified artifacts may be artifacts that are accessed to respond to queries by the analytics logic 114 to generate the analytics reports 106, 108, 110, 112, as indicated by the source metadata.

Various different techniques may be used to identify the artifacts. In some examples, source metadata accessed at operation 302 from analytics reports 106, 108, 110, 112 may indicate queries executed to generate the analytics reports. The migration tool 105 may utilize the queries to identify corresponding source deployment database artifacts used to respond to the queries. In some examples, the migration tool 105 may cross-reference analytics reports 106, 108, 110, 112 against queries actually executed against the source deployment databases 116, 118, 120. For example, the migration tool 105 may utilize source metadata to determine times during which one or more of the analytics reports 106, 108, 110, 112 were generated by the analytics logic 114. For example, audit logs or reports may indicate when various analytics reports 106, 108, 110, 112 were generated and/or when various queries were executed at the source deployment databases 116, 118, 120. Source deployment database artifacts that were accessed in response to queries made during the generation of an analytics report 106, 108, 110, 112 may be added to the identified source deployment database artifacts.

In some examples, an analytics report 106, 108, 110, 112 may indicated, for example, in its own metadata, that it can use a set of queries that is larger than the queries that are actually used or typically used to build the analytics report 106, 108, 110, 112. The migration tool 105 may be configured to detect these scenarios which, in some examples, may prevent extraneous migration of lightly used or unused data structures. For example, the migration tool may access metadata from an analytics report 106, 108, 110, 112 and/or API or SDK data indicating the queries that are supported by the respective analytics reports 106, 108, 110, 112. The migration tool 105 may compare the supported database queries to queries actually executed during the generation of the reports 106, 108, 110, 112. In this way, the migration tool 105 may detect queries that are merely supported and not actually or frequently used. The identified source deployment database artifacts may include artifacts that are the subject of queries actually and/or frequently executed.

Figure 4:
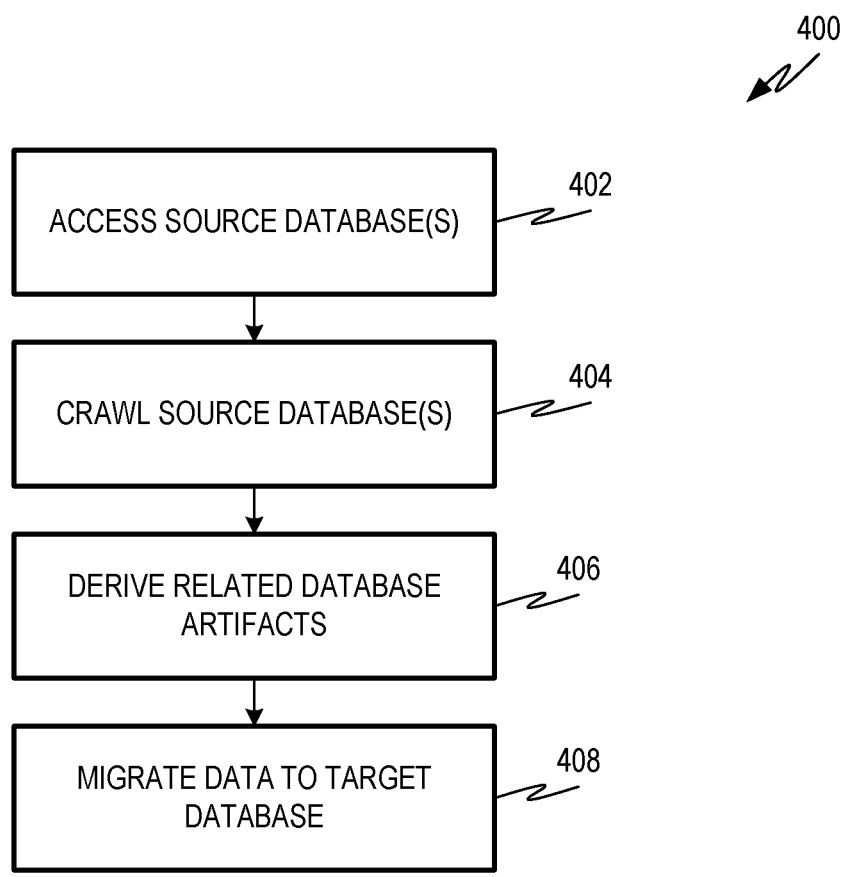
FIG. 4 is a flowchart showing one example of a process flow that may be executed by the migration tool to identify source deployment database artifacts for migration to the target deployment and migrate the corresponding data and/or artifacts.

FIG. 4 is a flowchart showing one example of a process flow 400 that may be executed by the migration tool 105 to identify source deployment database artifacts for migration to the target deployment 104 and migrate the corresponding data and/or artifacts. At operation 402, the migration tool 105 accesses the source deployment databases 116, 118, 120. For example, the migration tool 105 may establish a network connection with the source deployment 102. In some examples, the migration tool 105 prompts one or more users from the user group 156, 158 to provide access to the source deployment databases 116, 118, 120, for example, utilizing user credentials. At operation 404, the migration tool may crawl the source deployment databases 116, 118, 120. Crawling the source deployment databases 116, 118, 120 may include accessing the source deployment databases 116, 118, 120 to access the various source deployment database artifacts 122, 124, 126, 128, 130, 132, 134, 136. This may provide the migration tool with an indication of the various artifacts making up the schemas of the respective source deployment databases 116, 118, 120.

At operation 406, the migration tool 105 may derive related database artifacts, for example, based on the crawl of the source deployment database 116, 118, 120 at operation 404. In some examples, determining related database artifacts can be performed using a graphing algorithm, such as Dijkstra's algorithm or another shortest path algorithm. Nodes of the graphing algorithm may include, for example, database artifacts, records at database artifacts, and/or the like. The shortest path may identify relationships between the database artifacts and/or records thereof that may be used, as described herein, to generate analytics reports 150, 152, 154 at the target deployment 104. Accordingly, the migration tool 105 may have identified two sets of source deployment database artifacts. A first set of source deployment database artifacts may have been accessed directly by queries for generating the analytics reports 106, 108, 110, 112. The second set of source deployment database artifacts may include the related artifacts. At operation 408, the migration tool 105 may migrate the data corresponding to the identified source deployment database artifacts to the target database 140.

Figure 5:
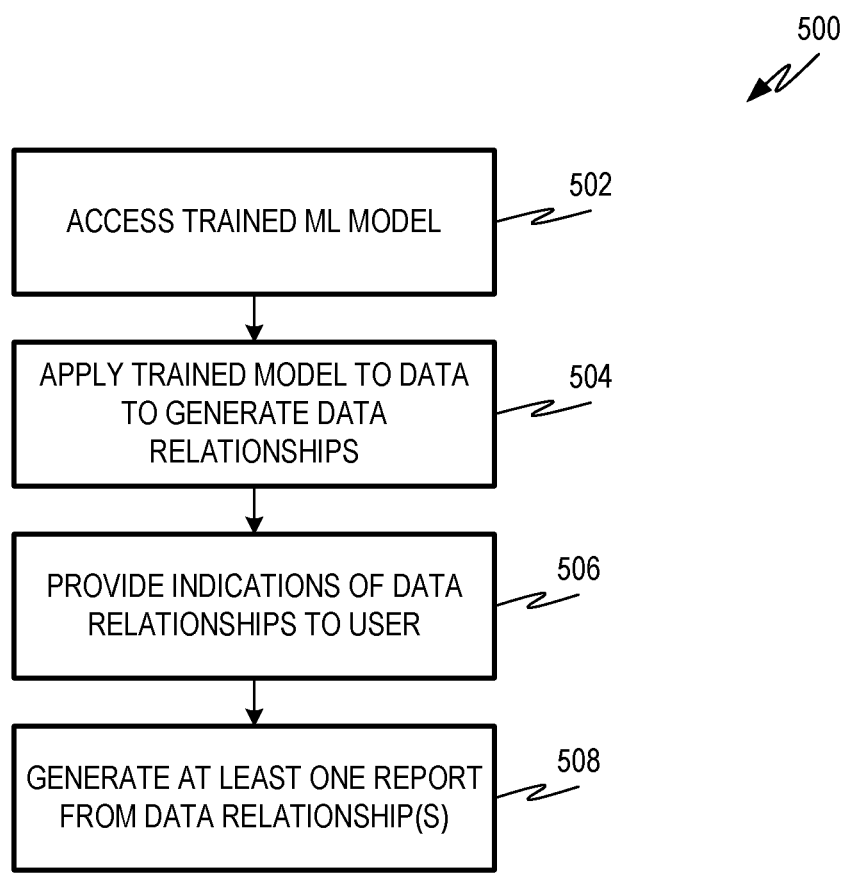
FIG. 5 is a flowchart showing one example of a process flow that may be executed by the migration tool to determine data relationships in the migrated data.

FIG. 5 is a flowchart showing one example of a process flow 500 that may be executed by the migration tool 105 (e.g., the data relationship generator 146 thereof) to determine data relationships 148 in the migrated data. At operation 502, the migration tool 105 accesses a trained machine learning model. The machine learning model may be any suitable model, such as a neural network model, that receives input indicating one or more database records and provides an output indicating relationships between the data indicated by the records. In some examples, the machine learning model may be trained using training data generated by business users, such as users from the user group 158. The users may be provided with permutations of relationships between data element types and asked to indicate whether the relationship is a suitable subject for an analytics report. Upon training, the trained machine learning model may be configured to detect relationships that are suitable subjects for analytics reports.

At operation 504, the migration tool 105 applies the trained machine learning model to the data migrated to the target database 140. The result may be a set of data relationships. At operation 506, the migration tool 105 provides an indication of set of data relationships to a user, such as a user from the user group 158. In some examples, the migration tool 105 expresses the data relationships as questions in a questionnaire. Consider example questions Q1 and Q2 below:

Q1) What are top categories of Total Spend?
Q2) What is the Total Spend per Time?
Q3) What's the predicted Total Spend for the next 3/6/12 (months, weeks, days etc) depending on historical data Time frequency?
Q4) Is the Trend coming up or down with the variance %?
Q5) Which Cost Center is spending the most?
Q6) Finance Cost Center has huge Travel Cost coming from a different system altogether
Q7) What are unusual expenses?

Questions Q1-Q4 may be derived from one or more data relationships between metric parameters and dimension parameters. In this example for Q1-Q4, the metric parameter is spend and the dimension parameter is time. For question Q5, the metric parameter is cost, and the dimension parameter is cost center. For Question Q6, the metric parameter is cost, and the dimension type parameter is cost type. In example, of Q7, the metric parameter is expense, and the dimension parameter is unusual, or low probability. Upon reviewing data relationships, for example, in the form of questions as in the example above, the user from the user group 158 may select a set of one or more relationships to be included in the analytics report or analytics reports 150, 152, 154. At operation 508, the analytics logic 142 may generate at least one analytics report 150, 152, 154 incorporating the selected data relationships 148.

In view of the disclosure above, various examples are set forth below. It should be noted that one or more features of an example, taken in isolation or combination, should be considered within the disclosure of this application.

Examples

Example 1 is a system of migrating an analytics tool from a source deployment to a target deployment, the system comprising: at least one processor programmed to perform operations comprising: accessing source metadata, the source metadata describing a plurality of source deployment queries to at least one source deployment database at the source deployment; identifying a plurality of source deployment database artifacts using the source metadata; migrating the plurality of source deployment database artifacts to a target database at the target deployment; applying a trained machine learning model to the plurality of source deployment database artifacts to generate a set of data relationships; receiving, from a user, a selection of a first data relationship of the set of data relationships; generating a first analytics report from the migrated plurality of source deployment database artifacts at the target database, the first analytics report corresponding to the first data relationship; and providing the first analytics report to a user via a user interface.

In Example 2, the subject matter of Example 1 optionally includes the accessing of the source metadata comprising: accessing at least one source analytics report generated at the source deployment; and reading, from the at least one source analytics report, an indication of at least one database query executed against the at least one source deployment database to generate the at least one source analytics report.

In Example 3, the subject matter of any one or more of Examples 1-2 optionally includes the accessing of the source metadata comprising: accessing an audit report at the source deployment; reading from the audit report an indication of at least one database query executed against the at least one source deployment database; and comparing the at least one database query to a generation of at least one source analytics report.

In Example 4, the subject matter of any one or more of Examples 1-3 optionally includes the operations further comprising: accessing an indication of a first set of database queries associated with a first source deployment analytics report; accessing an indication of a second set of database queries executed against the at least one source deployment database in association with the first source deployment analytics report; and the identifying of the plurality of source deployment database artifacts at the source deployment comprising comparing the first set of database queries and the second set of database queries.

In Example 5, the subject matter of any one or more of Examples 1-4 optionally includes the operations further comprising: accessing a first set of source deployment database artifacts referenced by the plurality of source deployment queries, the first set of source deployment database artifacts comprising at least one source deployment database table and at least one source deployment database view generated from the at least one source deployment database table; and identifying, using the first set of source deployment database artifacts, a second set of source deployment database artifacts, the plurality of source deployment database artifacts comprising the first set of source deployment database artifacts and the second set of source deployment database artifacts.

In Example 6, the subject matter of Example 5 optionally includes the identifying of the second set of source deployment database artifacts comprising applying a graphing algorithm to the at least one source deployment database.

In Example 7, the subject matter of any one or more of Examples 1-6 optionally includes the set of data relationships comprising a geographic relationship relating at least one metric parameter and a geographic location parameter.

In Example 8, the subject matter of any one or more of Examples 1-7 optionally includes the set of data relationships comprising a relationship relating at least one metric parameter and a time parameter.

Example 9 is a method of migrating an analytics tool from a source deployment to a target deployment, the method comprising: accessing source metadata, the source metadata describing a plurality of source deployment queries to at least one source deployment database at the source deployment; identifying a plurality of source deployment database artifacts using the source metadata; migrating the plurality of source deployment database artifacts to a target database at the target deployment; applying a trained machine learning model to the plurality of source deployment database artifacts to generate a set of data relationships; receiving, from a user, a selection of a first data relationship of the set of data relationships; generating a first analytics report from the migrated plurality of source deployment database artifacts at the target database, the first analytics report corresponding to the first data relationship; and providing the first analytics report to a user via a user interface.

In Example 10, the subject matter of Example 9 optionally includes the accessing of the source metadata comprising: accessing at least one source analytics report generated at the source deployment; and reading, from the at least one source analytics report, an indication of at least one database query executed against the at least one source deployment database to generate the at least one source analytics report.

In Example 11, the subject matter of any one or more of Examples 9-10 optionally includes the accessing of the source metadata comprising: accessing an audit report at the source deployment; reading from the audit report an indication of at least one database query executed against the at least one source deployment database; and comparing the at least one database query to a generation of at least one source analytics report.

In Example 12, the subject matter of any one or more of Examples 9-11 optionally includes accessing an indication of a first set of database queries associated with a first source deployment analytics report; accessing an indication of a second set of database queries executed against the at least one source deployment database in association with the first source deployment analytics report; and the identifying of the plurality of source deployment database artifacts at the source deployment comprising comparing the first set of database queries and the second set of database queries.

In Example 13, the subject matter of any one or more of Examples 9-12 optionally includes accessing a first set of source deployment database artifacts referenced by the plurality of source deployment queries, the first set of source deployment database artifacts comprising at least one source deployment database table and at least one source deployment database view generated from the at least one source deployment database table; and identifying, using the first set of source deployment database artifacts, a second set of source deployment database artifacts, the plurality of source deployment database artifacts comprising the first set of source deployment database artifacts and the second set of source deployment database artifacts.

In Example 14, the subject matter of Example 13 optionally includes the identifying of the second set of source deployment database artifacts comprising applying a graphing algorithm to the at least one source deployment database.

In Example 15, the subject matter of any one or more of Examples 9-14 optionally includes the set of data relationships comprising a geographic relationship relating at least one metric parameter and a geographic location parameter.

In Example 16, the subject matter of any one or more of Examples 9-15 optionally includes the set of data relationships comprising a relationship relating at least one metric parameter and a time parameter.

Example 17 is a non-transitory machine-readable medium comprising instructions thereon that, when executed by at least one processor, causes the at least one processor to perform operations comprising: accessing source metadata, the source metadata describing a plurality of source deployment queries to at least one source deployment database at the source deployment; identifying a plurality of source deployment database artifacts using the source metadata; migrating the plurality of source deployment database artifacts to a target database at the target deployment; applying a trained machine learning model to the plurality of source deployment database artifacts to generate a set of data relationships; receiving, from a user, a selection of a first data relationship of the set of data relationships; generating a first analytics report from the migrated plurality of source deployment database artifacts at the target database, the first analytics report corresponding to the first data relationship; and providing the first analytics report to a user via a user interface.

In Example 18, the subject matter of Example 17 optionally includes the accessing of the source metadata comprising: accessing at least one source analytics report generated at the source deployment; and reading, from the at least one source analytics report, an indication of at least one database query executed against the at least one source deployment database to generate the at least one source analytics report.

In Example 19, the subject matter of any one or more of Examples 17-18 optionally includes the accessing of the source metadata comprising: accessing an audit report at the source deployment; reading from the audit report an indication of at least one database query executed against the at least one source deployment database; and comparing the at least one database query to a generation of at least one source analytics report.

In Example 20, the subject matter of any one or more of Examples 17-19 optionally includes the operations further comprising: accessing an indication of a first set of database queries associated with a first source deployment analytics report; accessing an indication of a second set of database queries executed against the at least one source deployment database in association with the first source deployment analytics report; and the identifying of the plurality of source deployment database artifacts at the source deployment comprising comparing the first set of database queries and the second set of database queries.

Figure 6:
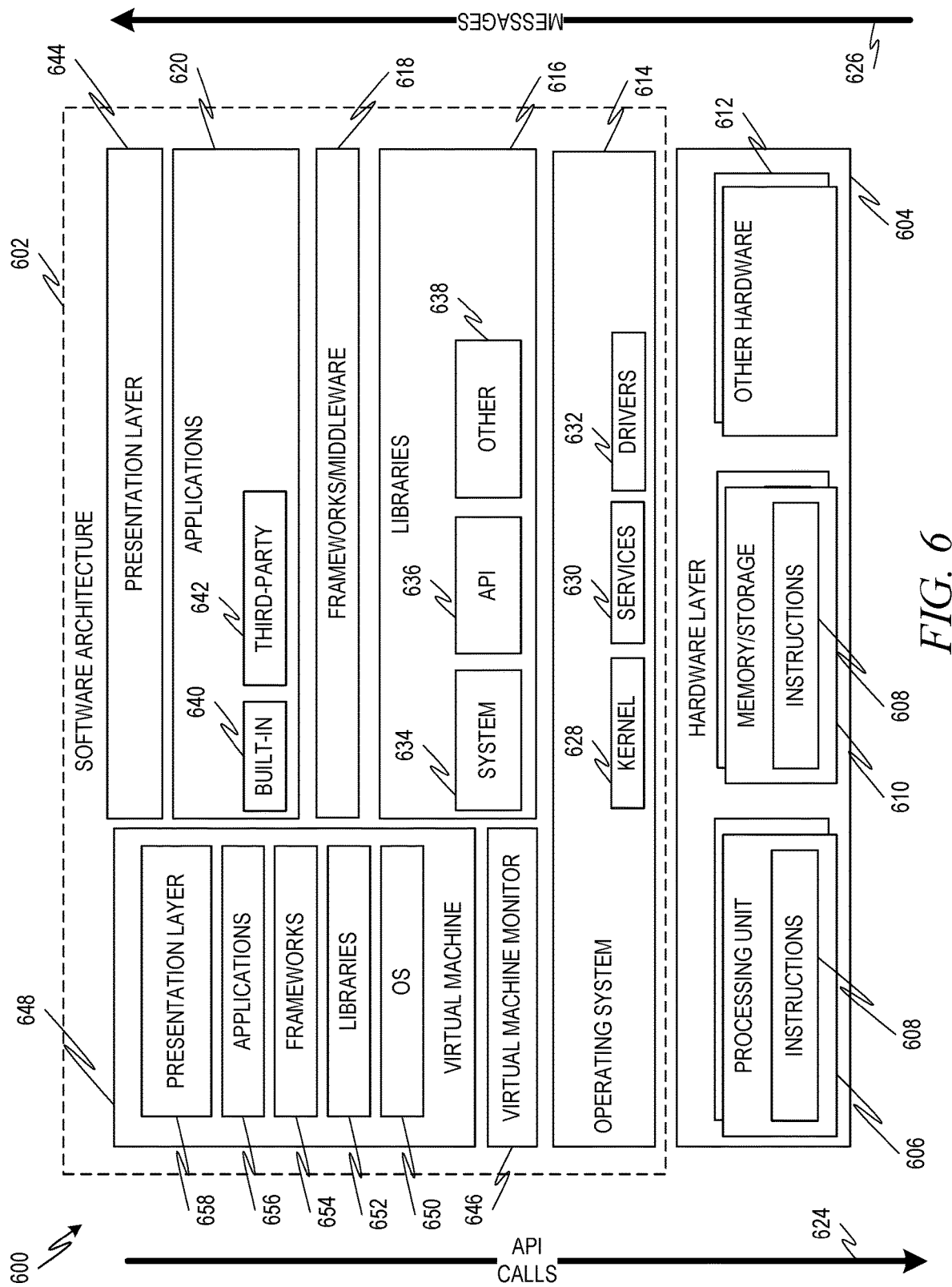
FIG. 6 is a block diagram showing one example of a software architecture for a computing device.

FIG. 6 is a block diagram 600 showing one example of a software architecture 602 for a computing device. The software architecture 602 may be used in conjunction with various hardware architectures, for example, as described herein. FIG. 6 is merely a non-limiting example of a software architecture and many other architectures may be implemented to facilitate the functionality described herein. A hardware layer 604 is illustrated and can represent, for example, any of the above referenced computing devices. In some examples, the hardware layer 604 may be implemented according to the architecture of the computer system of FIG. 6.

The hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612, which represents any other hardware of the hardware layer 604, such as the other hardware illustrated as part of the software architecture 602.

In the example architecture of FIG. 6, the software architecture 602 may be conceptualized as a stack of layers where each layer provides particular functionality. For example, the software architecture 602 may include layers such as an operating system 614, libraries 616, middleware layer 618, applications 620, and presentation layer 644. Operationally, the applications 620 and/or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the software architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The middleware layer 618 (also sometimes referred to as a frameworks layer) may provide a higher-level common infrastructure that may be utilized by the applications 620 and/or other software components/modules. For example, the middleware layer 618 may provide various graphic user interface (GUI) functions, high-level resource management, high-level location services, and so forth. The middleware layer 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a median application, a messaging application, and/or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630, and/or drivers 632), libraries (e.g., system libraries 634, API libraries 636, and other libraries 638), and middleware layer 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656, and/or presentation layer 658. These layers of software architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
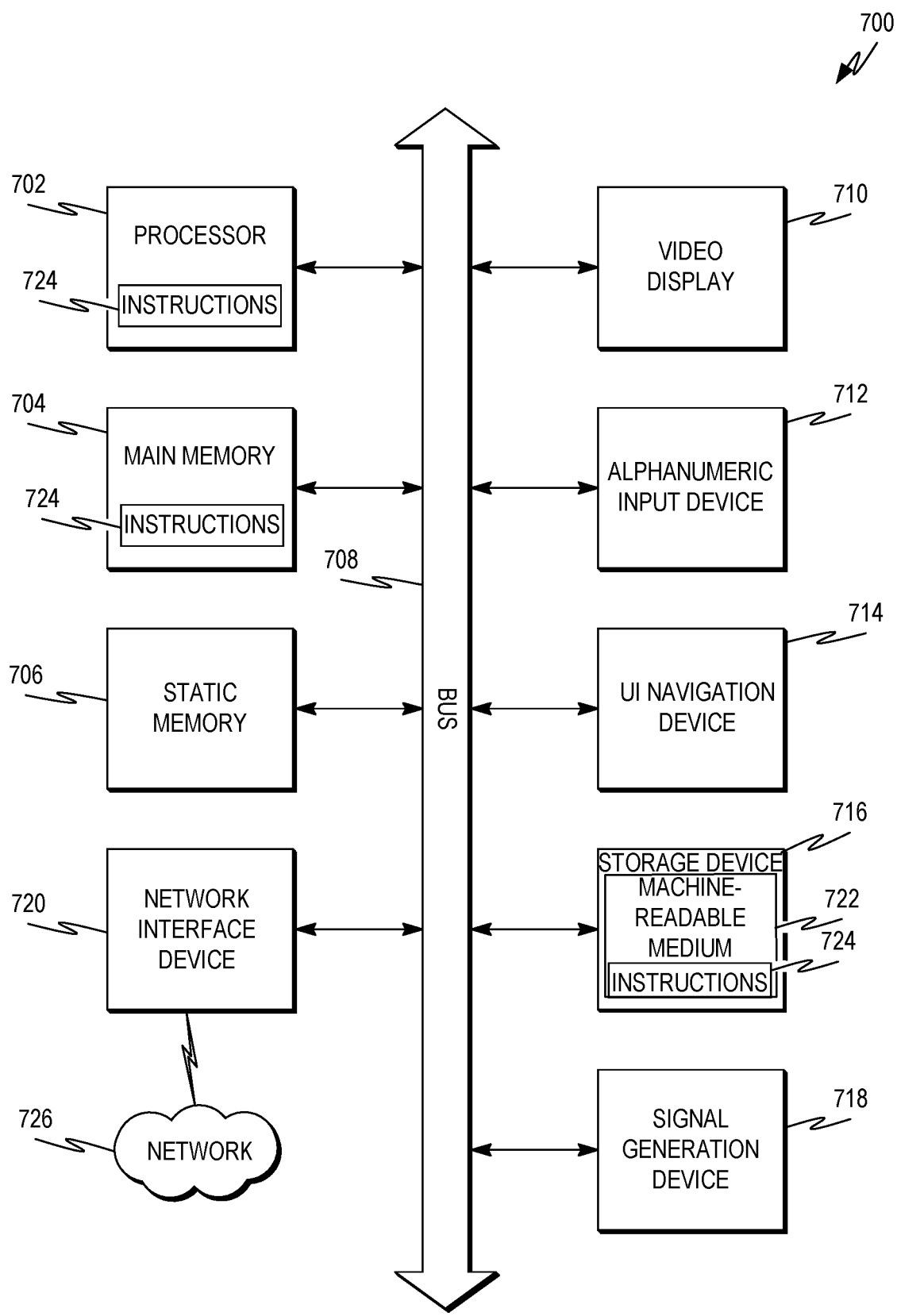
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system of migrating an analytics tool from a source deployment to a target deployment, the system comprising:
at least one processor programmed to perform operations comprising:
accessing source metadata, the source metadata describing a plurality of source deployment queries to at least one source deployment database at the source deployment;
identifying a plurality of source deployment database artifacts using the source metadata;
migrating the plurality of source deployment database artifacts to a target database at the target deployment;
applying a trained machine learning model to the plurality of source deployment database artifacts to generate a set of data relationships;
receiving, from a user, a selection of a first data relationship of the set of data relationships;
generating a first analytics report from the migrated plurality of source deployment database artifacts at the target database, the first analytics report corresponding to the first data relationship; and providing the first analytics report to a user via a user interface.

2. The system of claim 1, the accessing of the source metadata comprising:
   accessing at least one source analytics report generated at the source deployment; and
   reading, from the at least one source analytics report, an indication of at least one database query executed against the at least one source deployment database to generate the at least one source analytics report.

3. The system of claim 1, the accessing of the source metadata comprising:
   accessing an audit report at the source deployment;
   reading from the audit report an indication of at least one database query executed against the at least one source deployment database; and
   comparing the at least one database query to a generation of at least one source analytics report.

4. The system of claim 1, the operations further comprising:
   accessing an indication of a first set of database queries associated with a first source deployment analytics report;
   accessing an indication of a second set of database queries executed against the at least one source deployment database in association with the first source deployment analytics report; and
   the identifying of the plurality of source deployment database artifacts at the source deployment comprising comparing the first set of database queries and the second set of database queries.

5. The system of claim 1, the operations further comprising:
   accessing a first set of source deployment database artifacts referenced by the plurality of source deployment queries, the first set of source deployment database artifacts comprising at least one source deployment database table and at least one source deployment database view generated from the at least one source deployment database table; and
   identifying, using the first set of source deployment database artifacts, a second set of source deployment database artifacts, the plurality of source deployment database artifacts comprising the first set of source deployment database artifacts and the second set of source deployment database artifacts.

6. The system of claim 5, the identifying of the second set of source deployment database artifacts comprising applying a graphing algorithm to the at least one source deployment database.

7. The system of claim 1, the set of data relationships comprising a geographic relationship relating at least one metric parameter and a geographic location parameter.

8. The system of claim 1, the set of data relationships comprising a relationship relating at least one metric parameter and a time parameter.

9. A method of migrating an analytics tool from a source deployment to a target deployment, the method comprising:
   accessing source metadata, the source metadata describing a plurality of source deployment queries to at least one source deployment database at the source deployment;
   identifying a plurality of source deployment database artifacts using the source metadata;
   migrating the plurality of source deployment database artifacts to a target database at the target deployment;
   applying a trained machine learning model to the plurality of source deployment database artifacts to generate a set of data relationships;
   receiving, from a user, a selection of a first data relationship of the set of data relationships;
   generating a first analytics report from the migrated plurality of source deployment database artifacts at the target database, the first analytics report corresponding to the first data relationship; and
   providing the first analytics report to a user via a user interface.

10. The method of claim 9, the accessing of the source metadata comprising:
    accessing at least one source analytics report generated at the source deployment; and
    reading, from the at least one source analytics report, an indication of at least one database query executed against the at least one source deployment database to generate the at least one source analytics report.

11. The method of claim 9, the accessing of the source metadata comprising:
    accessing an audit report at the source deployment;
    reading from the audit report an indication of at least one database query executed against the at least one source deployment database; and
    comparing the at least one database query to a generation of at least one source analytics report.

12. The method of claim 9, further comprising:
    accessing an indication of a first set of database queries associated with a first source deployment analytics report;
    accessing an indication of a second set of database queries executed against the at least one source deployment database in association with the first source deployment analytics report; and
    the identifying of the plurality of source deployment database artifacts at the source deployment comprising comparing the first set of database queries and the second set of database queries.

13. The method of claim 9, further comprising:
    accessing a first set of source deployment database artifacts referenced by the plurality of source deployment queries, the first set of source deployment database artifacts comprising at least one source deployment database table and at least one source deployment database view generated from the at least one source deployment database table; and
    identifying, using the first set of source deployment database artifacts, a second set of source deployment database artifacts, the plurality of source deployment database artifacts comprising the first set of source deployment database artifacts and the second set of source deployment database artifacts.

14. The method of claim 13, the identifying of the second set of source deployment database artifacts comprising applying a graphing algorithm to the at least one source deployment database.

15. The method of claim 9, the set of data relationships comprising a geographic relationship relating at least one metric parameter and a geographic location parameter.

16. The method of claim 9, the set of data relationships comprising a relationship relating at least one metric parameter and a time parameter.

17. A non-transitory machine-readable medium comprising instructions thereon that, when executed by at least one processor, causes the at least one processor to perform operations comprising:
- accessing source metadata, the source metadata describing a plurality of source deployment queries to at least one source deployment database at the source deployment;
- identifying a plurality of source deployment database artifacts using the source metadata;
- migrating the plurality of source deployment database artifacts to a target database at the target deployment;
- applying a trained machine learning model to the plurality of source deployment database artifacts to generate a set of data relationships;
- receiving, from a user, a selection of a first data relationship of the set of data relationships;
- generating a first analytics report from the migrated plurality of source deployment database artifacts at the target database, the first analytics report corresponding to the first data relationship; and
- providing the first analytics report to a user via a user interface.

18. The medium of claim 17, the accessing of the source metadata comprising:
- accessing at least one source analytics report generated at the source deployment; and
- reading, from the at least one source analytics report, an indication of at least one database query executed against the at least one source deployment database to generate the at least one source analytics report.

19. The medium of claim 17, the accessing of the source metadata comprising:
- accessing an audit report at the source deployment;
- reading from the audit report an indication of at least one database query executed against the at least one source deployment database; and
- comparing the at least one database query to a generation of at least one source analytics report.

20. The medium of claim 17, the operations further comprising:
- accessing an indication of a first set of database queries associated with a first source deployment analytics report;
- accessing an indication of a second set of database queries executed against the at least one source deployment database in association with the first source deployment analytics report; and
- the identifying of the plurality of source deployment database artifacts at the source deployment comprising comparing the first set of database queries and the second set of database queries.

* * * * *